US008504112B2

(12) United States Patent
Lee

(10) Patent No.: US 8,504,112 B2
(45) Date of Patent: Aug. 6, 2013

(54) METHODS FOR SEARCHING PHONE BOOK, AND PORTABLE DEVICES AND INFORMATION PROCESSING APPARATUSES HAVING PHONE-BOOK SEARCH FUNCTION

(75) Inventor: Su-Seon Lee, Seongnam (KR)

(73) Assignee: KT Corporation, Kyeonggi-do (KR)

( * ) Notice: Subject to any disclaimer, the term of this patent is extended or adjusted under 35 U.S.C. 154(b) by 1242 days.

(21) Appl. No.: 12/003,543

(22) Filed: Dec. 28, 2007

(65) Prior Publication Data
US 2009/0074171 A1 Mar. 19, 2009

(30) Foreign Application Priority Data

Sep. 18, 2007 (KR) .............................. 2007-0094852

(51) Int. Cl.
H04M 3/42 (2006.01)
(52) U.S. Cl.
USPC ........... 455/566; 455/418; 345/168; 345/158; 379/218.01
(58) Field of Classification Search
USPC .................. 455/418, 566; 345/168, 158, 173; 379/218.01, 218.02; 715/200, 201, 202, 204, 715/700
See application file for complete search history.

(56) References Cited

FOREIGN PATENT DOCUMENTS

| KR | 10-2002-0069964 | 9/2002 |
|---|---|---|
| KR | 10-2004-0041862 | 5/2004 |
| KR | 10-2005-0091285 | 9/2005 |
| KR | 10-2005-0102741 | 10/2005 |
| KR | 10-2005-01027411 | 10/2005 |

OTHER PUBLICATIONS

Office Action dated Jul. 25, 2008 issued in connection with the counterpart Korean Application No. 10-2007-0094852.

Primary Examiner — Kamran Afshar
Assistant Examiner — Sayed T Zewari
(74) Attorney, Agent, or Firm — Harness, Dickey & Pierce, P.L.C.

(57) ABSTRACT

Method of searching a phone book in an information processing apparatus, such as a portable device, may provide intelligent search of information associated with user-selected information. The method includes selecting a desired item of a plurality of item included in a phone book list, searching at least one item associated with the selected item on a database according to a predetermined priority, and displaying both the selected item and the searched associated at least one item. Thus, the information associated with the user-selected information can be intelligently searched, such that a search result optimized for a user may be displayed and unnecessary repetitive search may be reduced.

19 Claims, 6 Drawing Sheets

METHODS FOR SEARCHING PHONE BOOK, AND PORTABLE DEVICES AND INFORMATION PROCESSING APPARATUSES HAVING PHONE-BOOK SEARCH FUNCTION

CROSS-REFERENCE TO RELATED APPLICATION

This application claims the benefit of Korean Patent Application No. 2007-94852 which was filed on Sep. 18, 2007, which are hereby incorporated by reference as if fully set forth herein.

BACKGROUND OF THE INVENTION

1. Field of the Invention

The present invention relates to searching a phone number in an information processing apparatus, and more particularly, to methods, which is capable of searching information associated with information selected by a user during the user searches a phone number, searching a phone book, and portable devices and information processing apparatuses that have a phone-book search function.

2. Discussion of Related Art

In general, portable devices, such as mobile communication devices and Personal Digital Assistants (PDAs), have a phone book function for enabling a user to register frequently used phone numbers and search a required one of the registered phone numbers.

The phone book is one of additional functions of portable devices. The phone book allows a user to register phone numbers; and names, abbreviated numbers, and the like corresponding to the phone number, and to enable a communication through the portable device by simply inputting the abbreviated number or by searching for a desired phone number to press a 'call' button, instead of inputting each number of the phone number.

With the recent advent of high-performance processors and high-capacity memories for portable devices, the number of phone numbers registered in the phone book and the type of information associated with the phone numbers are increasing.

However, as the number of phone numbers and the amount of the associated information registered in the phone book increase, it becomes difficult for the user to search for a desired phone number or information associated with the desired phone number, and time required for the search increases.

FIG. 1 illustrates a user interface screen for search of a phone book in a conventional portable device.

Referring to FIG. 1, in the conventional portable device, when a phone book function is selected by a user, an initial screen 10 for menus of the phone book is displayed.

The initial user interface screen 10 for the phone book menus includes menu items, such as Full View 11, Search Phone Number 12, Register Phone Number 13, Manage Abbreviated Number 14, and Edit Group 15. When the user selects Full View 10 among the menu items of the initial user interface screen 10, a plurality of phone numbers registered in the phone book are aligned and displayed in an order of names corresponding to the phone numbers.

When the user selects Search Phone Number 12 on the initial user interface screen 10 for phone book menus, a sub menu 20 for Search Phone Number is displayed. The sub menu 20 for Search Phone Number may include menus such as Search Name 21, Search Number 22, and Search Group 23.

When the user selects Search Number 22, a user interface screen 30, on which the user inputs a desired phone number to be searched, is displayed.

As described above, in the conventional portable device, the phone numbers registered in the phone book are all aligned and displayed in the order of names, or the name, the number or the group is input for search by a user. This requires a user to inconveniently confirm the phone numbers aligned and displayed in the order of names, one by one, to select a desired phone number, or to enter a phone number to be searched or a name associated with the phone number. Disadvantageously, in the phone book function of the conventional portable device, only information registered in the phone book is searched and passively displayed irrespective of a user's call pattern, and accordingly, even when similar information is searched, the same search process should be repeatedly performed.

Meanwhile, a method for searching a phone book field in a mobile phone is disclosed in Korean Patent No. 608770 entitled "Method For Display By Searching Phone Book Field In Mobile Phone", in which when a selection cursor (or bar) is located on an item corresponding to a phone book field while a user reads a content of an e-mail received by a mobile phone, overall stored phone book information associated with the selected item is displayed on a user interface screen. According to Korean Patent No. 608770, the overall stored associated phone book information is collectively displayed on the user interface screen irrespective of a user's call pattern. Thus, Korean Patent No. 608770 cannot provide intelligent search of desired information associated with the selected item.

SUMMARY OF THE INVENTION

The present invention is directed to methods of searching a phone book in a portable device which is capable of providing intelligent search of information associated with user-selected information.

The present invention is also directed to information processing apparatuses having a phone-book search function to provide intelligent search of information associated with user-selected information.

The present invention is also directed to methods of searching a phone book in an information processing apparatus, which is capable of providing intelligent search of information associated with user-selected information.

In other example embodiments, a method of searching a phone book in a portable device includes: selecting a desired item of a plurality of item included in a phone book list; searching at least one item associated with the selected item on a database according to a predetermined priority; and displaying both the selected item and the searched associated at least one item. The desired item may include at least one of a name, a company name, a phone number, a facsimile number, an abbreviated number, a group name, an e-mail address, a birthday, a memorial day, a memo, a photograph, an avatar, a receiving bell, and a message ring. The database may include information included in the respective items of the phone book, and a call record for the portable device. The predetermined priority may be set by a user. The predetermined priority may include item information for searching the at least one item associated with the selected item and search priority information for items associated with the same item information. The displaying both the selected item and the searched associated at least one item may include displaying, as representative information, at least one of a plurality of information included in each of the selected item and the searched associated at least one item. When, the selected item is selected as another item after the selected item and the searched associated at least one item are simultaneously displayed, the method may further include re-searching items associated with the selected another item. When at least one event of a voice communication event, an image communication event, a message transmission event and a message reception event occurs after the selected item and the searched associated at least one item are simultaneously displayed, the method may further include processing the occurring event to update the database based on the occurring event.

In other example embodiments, an information processing apparatus having a phone-book search function include: a controller configured to control, when a desired item of a plurality of item included in a phone book list is selected, configured to search at least one item associated with the selected item on a database according to a predetermined priority, and configured to display both the selected item and the searched associated at least one item; and a storage unit configured to store the database. The database may include information included in the respective items of the phone book, and a call record for the portable device. The predetermined priority may be set by a user. The predetermined priority may include item information for searching the at least one item associated with the selected item and search priority information for items associated with the same item information. The controller may display, as representative information, at least one of a plurality of information included in each of the selected item and the searched associated at least one item.

In still other example embodiments, a method of searching a phone book in an information processing apparatus include: selecting a desired item of a plurality of item included in a phone book list; searching at least one item associated with the selected item on a database according to a predetermined priority; and displaying both the selected item and the searched associated at least one items. The desired item may include at least one of a name, a company name, a phone number, a facsimile number, an abbreviated number, a group name, an e-mail address, a birthday, a memorial day, a memo, a photograph, an avatar, a receiving bell, and a message ring. The predetermined priority may be set by a user. The predetermined priority may include item information for searching the at least one items associated with the selected item and search priority information for items associated with the same item information. The displaying both the selected item and the searched associated at least one items may include displaying, as representative information, at least one of a plurality of information included in each of the selected item and the searched associated at least one items. The method may further include, when the selected item is selected as another item after the selected item and the searched associated at least one item are simultaneously displayed, re-searching items associated with the selected another item. The method may further include, when at least one event of a voice communication event, an image communication event, a message transmission event and a message reception event occurs after the selected item and the searched associated at least one item are simultaneously displayed, processing the occurring event to update the database based on the occurring event.

BRIEF DESCRIPTION OF THE DRAWINGS

The above and other features and advantages of the present invention will become more apparent to those of ordinary skill in the art by describing in detail preferred exemplary embodiments thereof with reference to the attached drawings in which.

DETAILED DESCRIPTION OF EXEMPLARY EMBODIMENTS

Hereinafter, exemplary embodiments of the present invention will be described in detail. However, the present invention is not limited to the exemplary embodiments disclosed below, but can be implemented in various types. Therefore, the present exemplary embodiments are provided for complete disclosure of the present invention and to fully inform the scope of the present invention to those ordinarily skilled in the art. The like reference symbols indicate the same or similar components.

Terms "first" and "second" may be used to indicate various components, but are not intended to limit the components. The terms are only used to identify one component from other components. For example, a first component may be named a second component without departing from the spirit and scope of the present invention. Similarly, a second component may be named a first component. A term "and/or" includes a combination of a plurality of relevant items or any of the plurality of relevant items.

Figure 1:
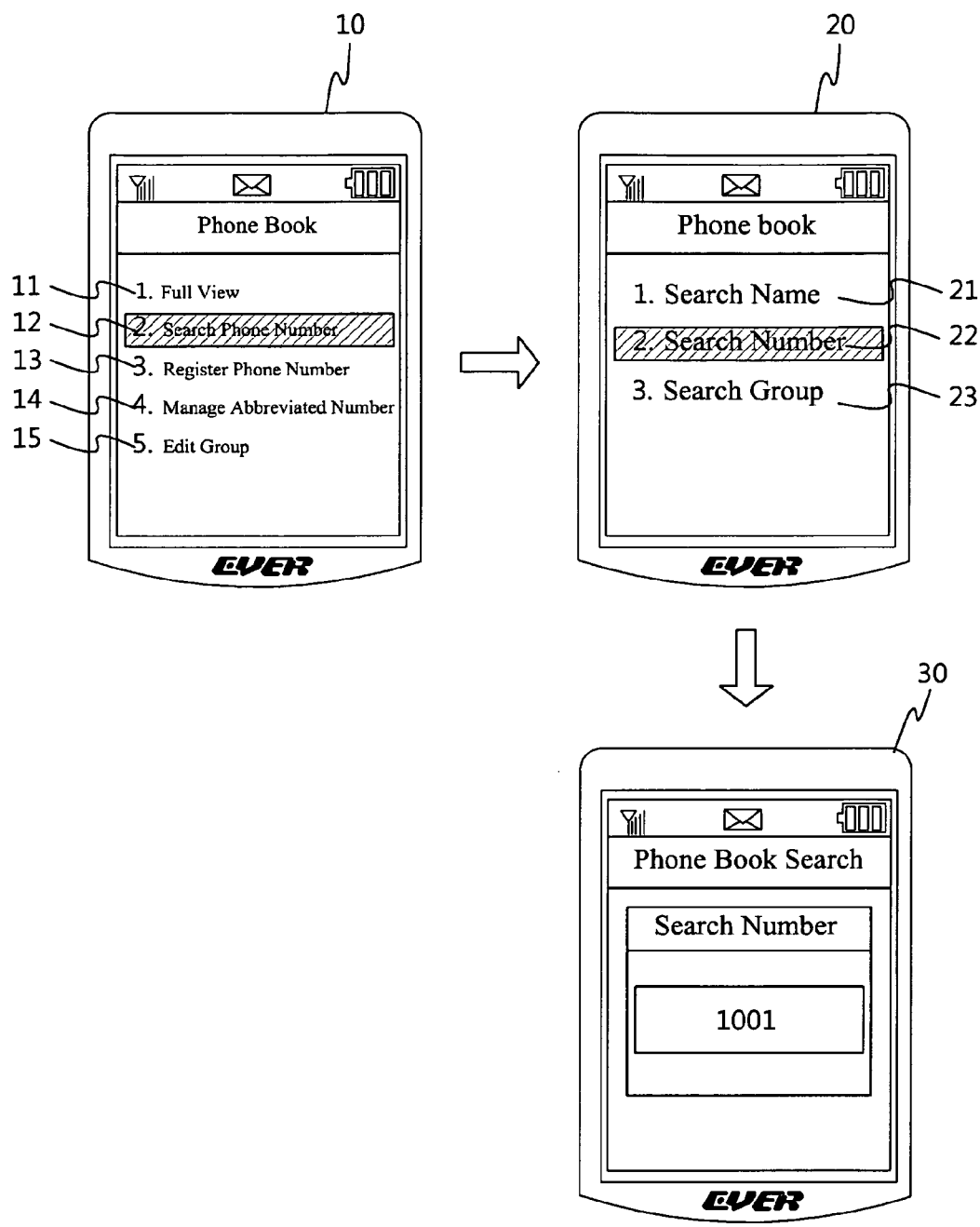
FIG. 1 illustrates a user interface screen for search of a phone book in a conventional portable device.
Figure 2:
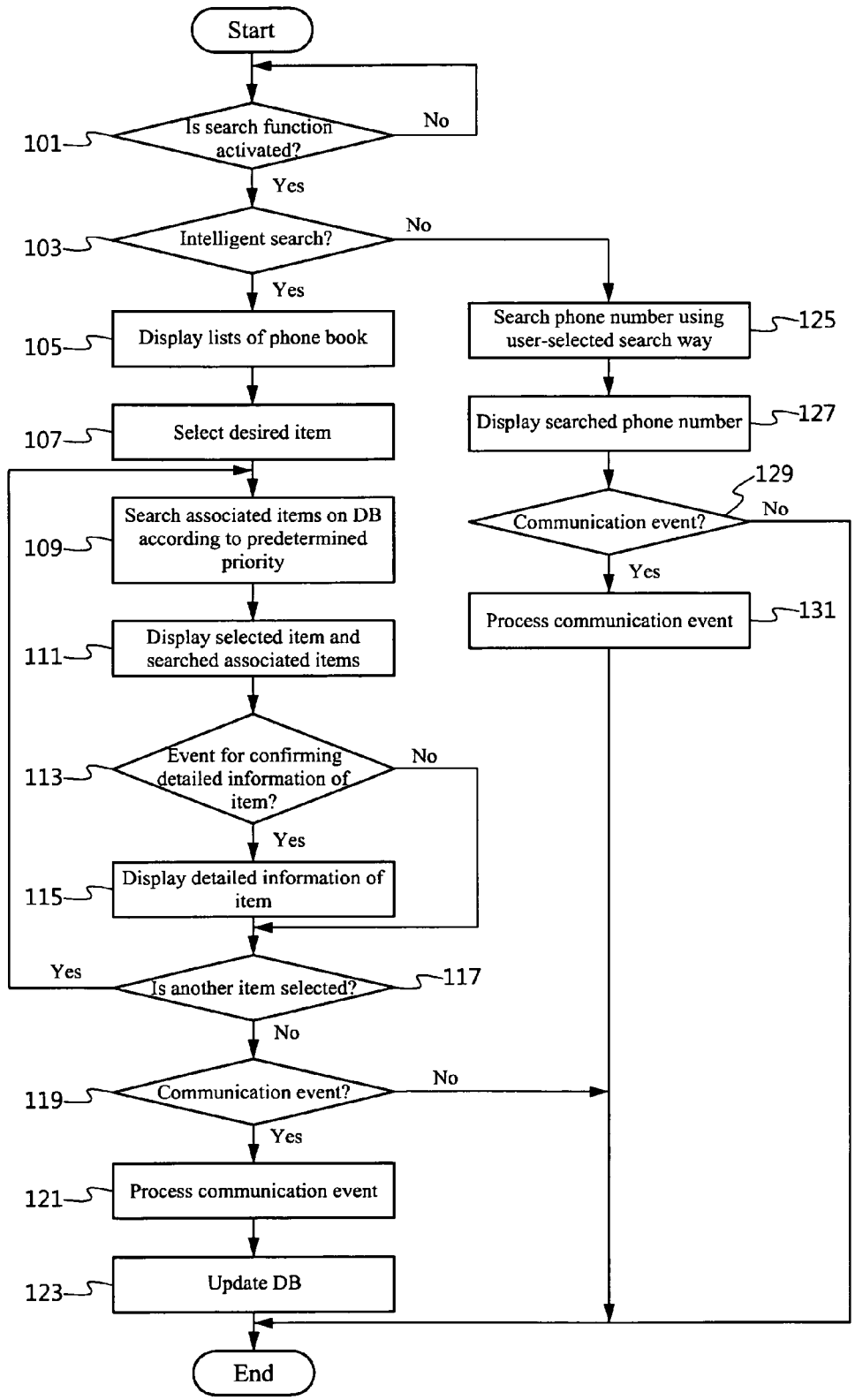
FIG. 2 is a flowchart illustrating a process of searching a phone book in a portable device according to an exemplary embodiment of the present invention.
Figure 3:
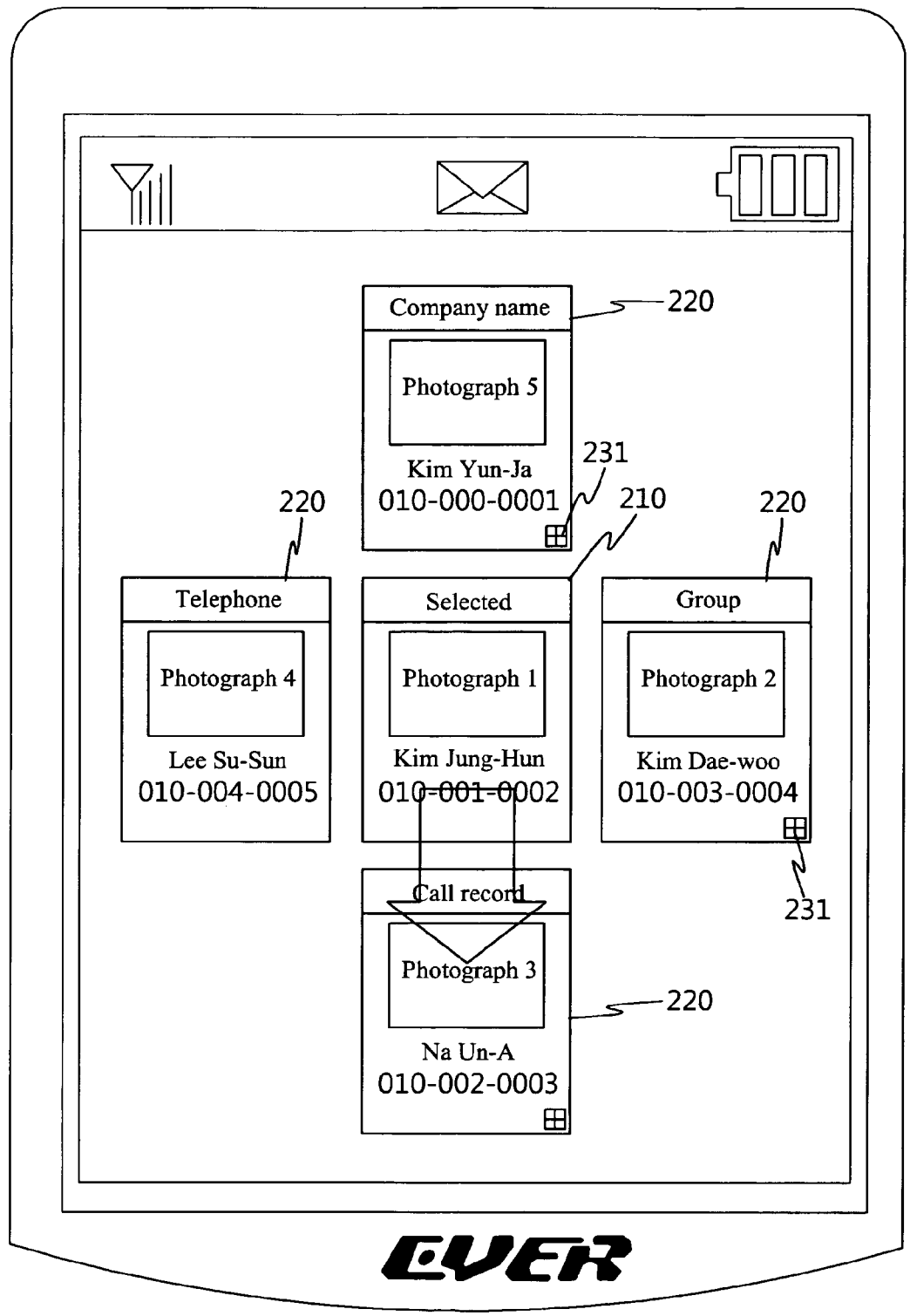
FIG. 3 illustrates a user interface screen displaying associated items that are searched in the process of searching a phone book in a portable device as shown in FIG. 2.
Figure 4:
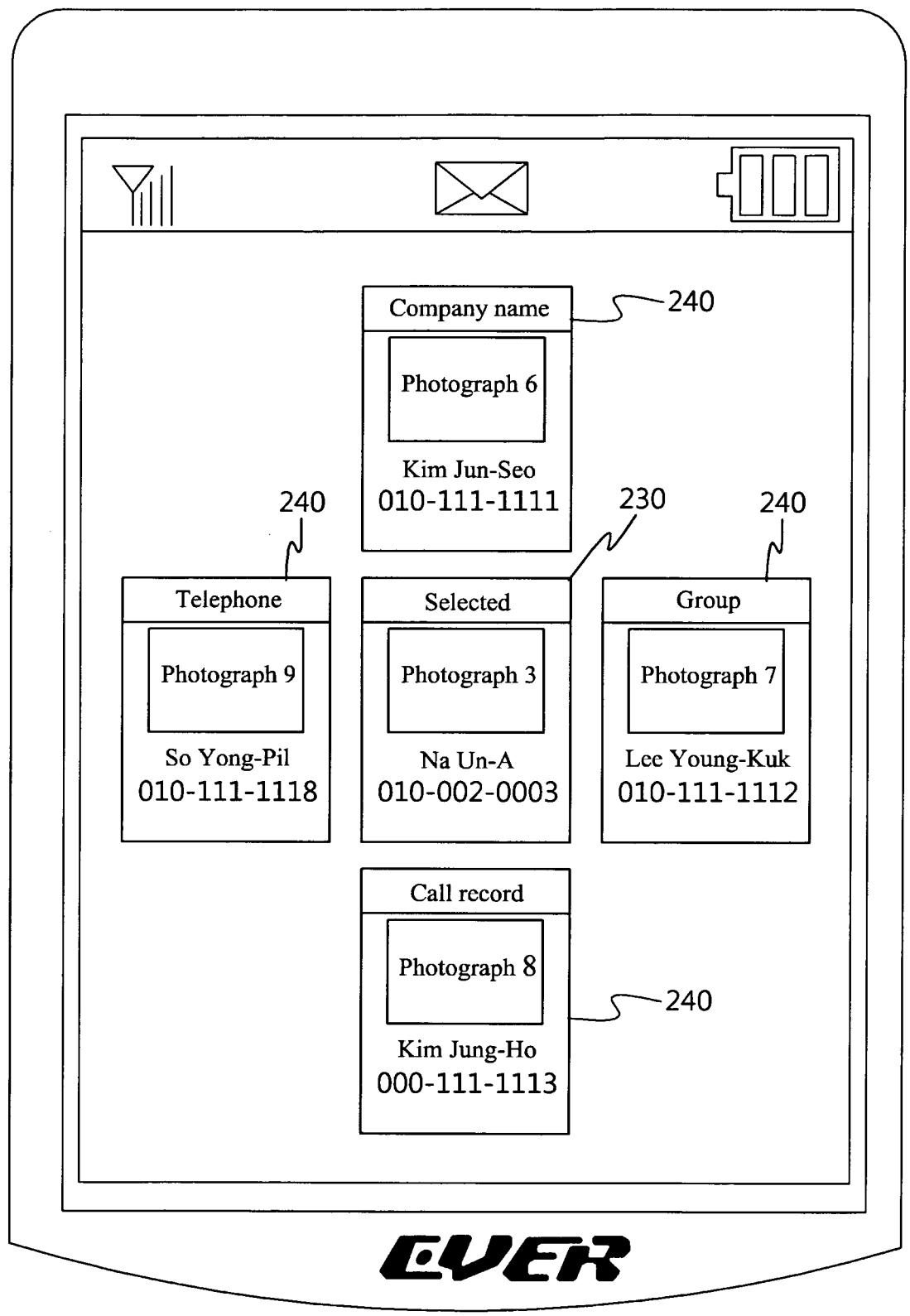
FIG. 4 illustrates a user interface screen displaying items associated with another item selected on the user interface screen in FIG. 3.

FIG. 2 is a flowchart illustrating a process of searching a phone book in a portable device according to an exemplary embodiment of the present invention, and FIG. 3 illustrates a user interface screen displaying associated items that are searched in the process of searching a phone book in a portable device as shown in FIG. 2. FIG. 4 illustrates a user interface screen displaying items associated with another item selected on the user interface screen in FIG. 3.

Referring to FIGS. 2 to 4, first, the portable device determines whether a phone-book search function is activated (step 101). If the phone-book search function is activated, the portable device determines whether a search method is set as an intelligent search or a general search (step 103). Here, the phone-book search function may be activated when the user presses a predetermined function key (e.g., a hot key) or selects a menu on the portable device. The user may set the intelligent search as the search method in advance by selecting a corresponding menu. Alternatively, the user may set the intelligent search by pressing a predetermined function key after the phone-book search function is activated.

If it is determined in step 103 that the intelligent search is set as the search method, the portable device displays a plurality of lists included in the phone book according to a predetermined way (step 105). When the phone-book search is a first attempted search, the lists included in the phone book may be aligned in an order of names and a plurality of aligned items may be displayed. When the phone-book search is not a first attempted search, an item selected upon a previous phone-book search and associated items searched by the intelligent search may be displayed.

The user then selects a desired item of items on the displayed list of the phone book (step 107). Here, the items may include at least one of a name, a phone number (of a portable phone, home and/or company), a company name, a facsimile number, an abbreviated number, a group name, an e-mail address, a birthday, a memorial day, a memo, a photograph, an avatar, a receiving bell type, and a message ring type.

In step 107, when the user selects a desired item, the portable device searches for at least one items associated with the selected item on a database stored in a storage unit according to a predetermined priority (step 109), and displays both the selected item and the associated at least one items (step 111). Here, the selected item and the associated at least one items may be simultaneously displayed.

Here, the selected item and the associated at least one items displayed on the display unit of the portable device may be predetermined representative information of the information included in each of the items. For example, as shown in FIG. 3, a name, a phone number, a photograph, and the like included in each of the items may be displayed as the representative information of the item. The database may be built for the intelligent search. The database may include all information included in the phone book and the portable device's record information recorded during the operation of the portable device (e.g., a user's call history).

In step 111, the selected item 210 is displayed at a center portion of a display area of the display unit and the associated items 220 are displayed around the selected item so that the user may easily confirm the search result, as shown in FIG. 3.

In searching the associated at least one item in step 109, if one or more items are searched based on the same associated-item criterion, each of the searched items is displayed and a maximization button 231 is displayed on the displayed item as shown in FIG. 3, so that the user may confirm another item searched based on the same associated-item criterion by selecting the maximization button 231 when one or more items are searched based on the same associated-item criterion.

The portable device then determines whether the user causes an event for confirming detailed information of any one of the items displayed in step 111 (step 113). If it is determined that the event for confirming the detailed information of the item occurs, the portable device displays detailed information of the item corresponding to the event (step 115).

Here, the event for confirming the detailed information for the item may occur when the user selects any item of the items displayed in step 111 and then selects a function key (e.g., an 'OK' key) of the key input unit. In addition to the representative information displayed in step 111, the detailed information of the item may include information such as a phone number, a company name, a facsimile number, an abbreviated number, a group name, an e-mail address, a birthday, a memorial day, a memo, an avatar, a receiving bell type, message ring type, etc.

The portable device determines whether the user selects any item of the associated at least one item displayed around the center portion of the display area among the items displayed in step 111 (step 117). If it is determined whether the associated at least one item is selected, the process returns to step 109. In step 109, the portable device searches for at least one item associated with newly selected item (e.g., the item 230) on the database, and then displays the newly selected item 230 at the center portion of the display area and the searched associated at least one item 240 around the selected item 230, as shown in FIG. 4.

Steps 113 and 115, and step 117 may be performed in a reverse order.

The portable device determines whether a communication event for the displayed selected item occurs (step 119). If it is determined that the communication event occurs, the portable device processes the communication event (step 121). Here, examples of the communication event may include a voice communication event, a image (video) communication event, a message (short message service (SMS) or multimedia message service (MMS)) transmission event, and a message reception event, etc.

The portable device then updates the database stored in the storage unit, based on the processed communication event (step 123).

That is, in the method for searching a phone book in a portable device according to an exemplary embodiment of the present invention, since the intelligent search is performed based on the information in the phone book input by the user and the record information (e.g., a call record and a message transmission and reception record) automatically generated during the operation of the portable device, the database is updated when the communication event is performed in step 121.

If it is determined in step 103 that the set search method is not the intelligent search, the portable device recognizes that the search method is the general search, and searches the phone number using the same scheme as a conventional phone-book searching scheme.

That is, the portable device searches the phone number using a user-selected searching way (e.g., Name Search, Number Search or Group Search) (step 125), and displays the searched phone number (step 127). If a communication event occurs by the user (step 129), the portable device processes the communication event (step 131).

Figure 5:
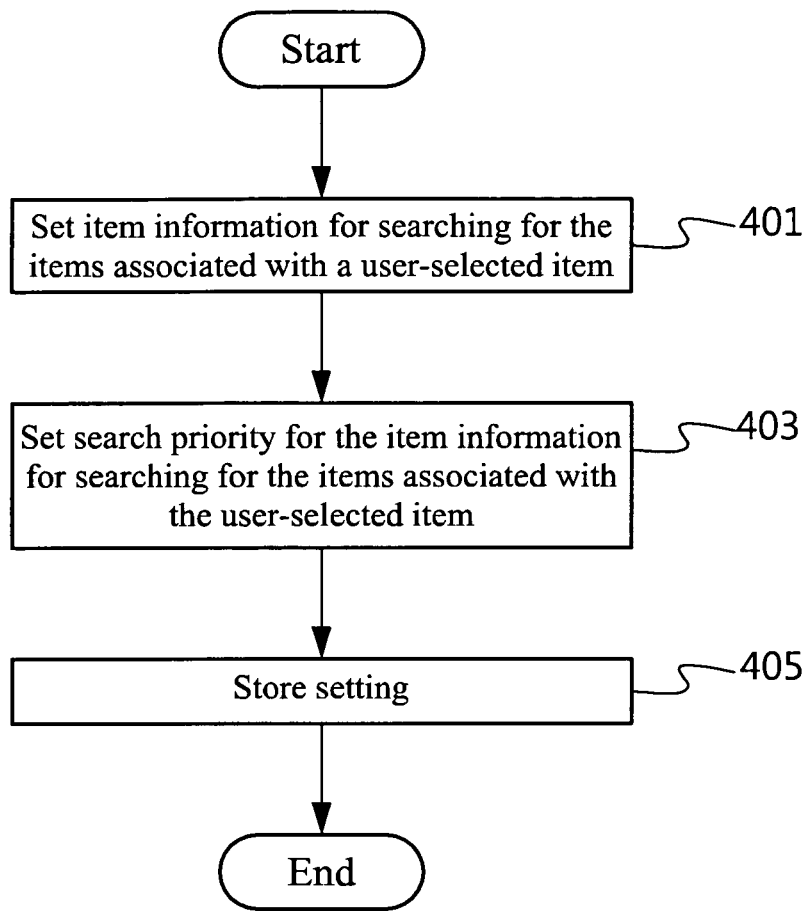
FIG. 5 is a flowchart illustrating a process of setting associated items to be displayed in the method for searching a phone book in a portable device according to an exemplary embodiment of the present invention.
Figure 6:
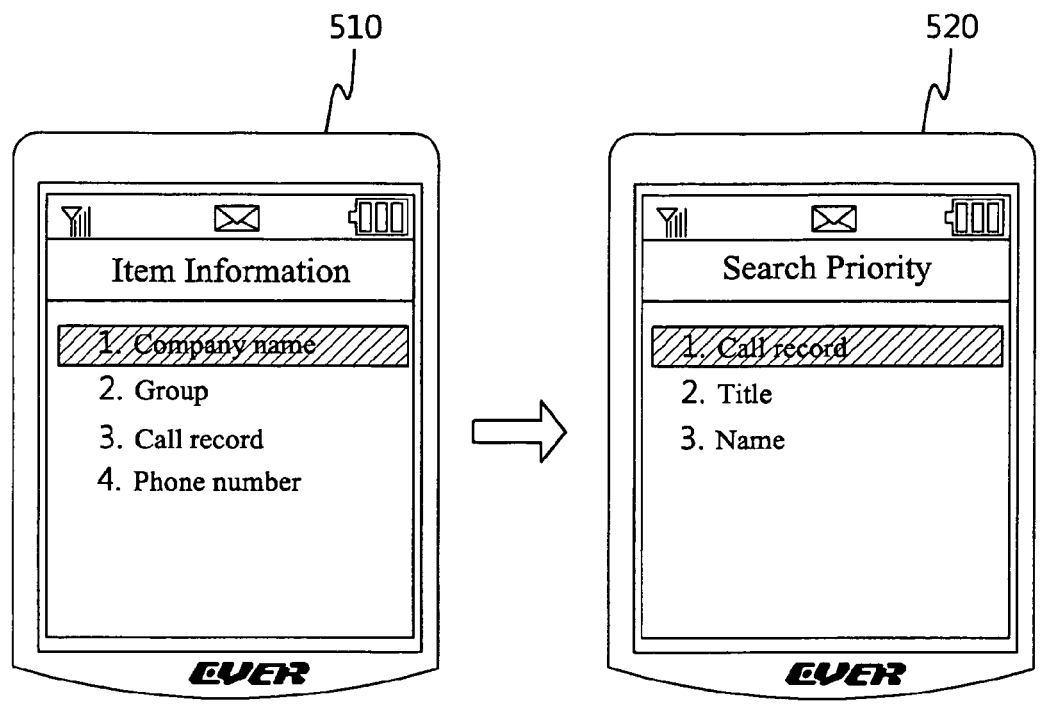
FIG. 6 illustrates a user interface screen for setting associated items to be displayed and a search priority in the process of setting associated items to be displayed in FIG. 5.

FIG. 5 is a flowchart illustrating a process of setting associated items to be displayed in the method for searching a phone book in a portable device according to an exemplary embodiment of the present invention, and FIG. 6 illustrates a user interface screen for setting associated items to be displayed and a search priority in the process of setting associated items to be displayed in FIG. 5.

Referring to FIGS. 5 and 6, first, the user sets item information for searching the items associated with a user-selected item upon intelligent search on a user interface screen 510 for setting information on associated items to be searched, as shown in FIG. 6 (step 401).

Examples of the item information for searching the at least one item associated with the user-selected item may be a company name, a group, a call record, a phone number, an e-mail, etc. When the intelligent search is activated, the portable device compares the item information for searching the at least one item associated with the user-selected item, with other items and the call record included in the database.

In FIG. 6, the item information for searching the at least one item associated with the user-selected item is shown as being the company name, the group, the call record, and the phone number. For example, when the intelligent search is activated, the portable device searches for an item including the same company name as the company name included in the user-selected item, searches for an item including the same group name as the group name included in the user-selected item, searches for an item having a call record within a predetermined time (e.g., one hour) from the time of a phone-call in the user-selected item, and an item including a phone number having the same telephone office number as a phone number included in the user-selected item.

The user then sets a search priority for each item set as the item information for searching the at least one item associated with the user-selected item, on a user interface screen 520 for setting a search priority in FIG. 6 (step 403). The item information for searching the at least one item associated with the user-selected item and the search priority information set by the user are stored in step 405. Here, the search priority may be equally set among the items set as the item information for searching the at least one item associated with the user-selected item, or may be differently among the item information for searching the at least one item associated with the user-selected item.

For example, when the user sets the company name, the group, the call record, and the phone number as the item information for searching the at least one item associated with the user-selected item, and sets the search priority for the company name in an order of the call record, the title, and the name and when the user selects a desired item on the phone book and then activates the intelligent search, the portable device searches for an item having a call record similar with a recent call record of the selected item (e.g., within one hour) among items having the same company name as that included in the selected item. If there are a plurality of items having the similar call record, the portable device searches for an item having the most similar title according to the next priority. If there are a plurality of items having similar time of a phone-call and title, the portable device searches for an item having a similar name according to the subsequent priority and displays the searched items around the user-selected item as shown in FIGS. 3 and 4.

Figure 7:
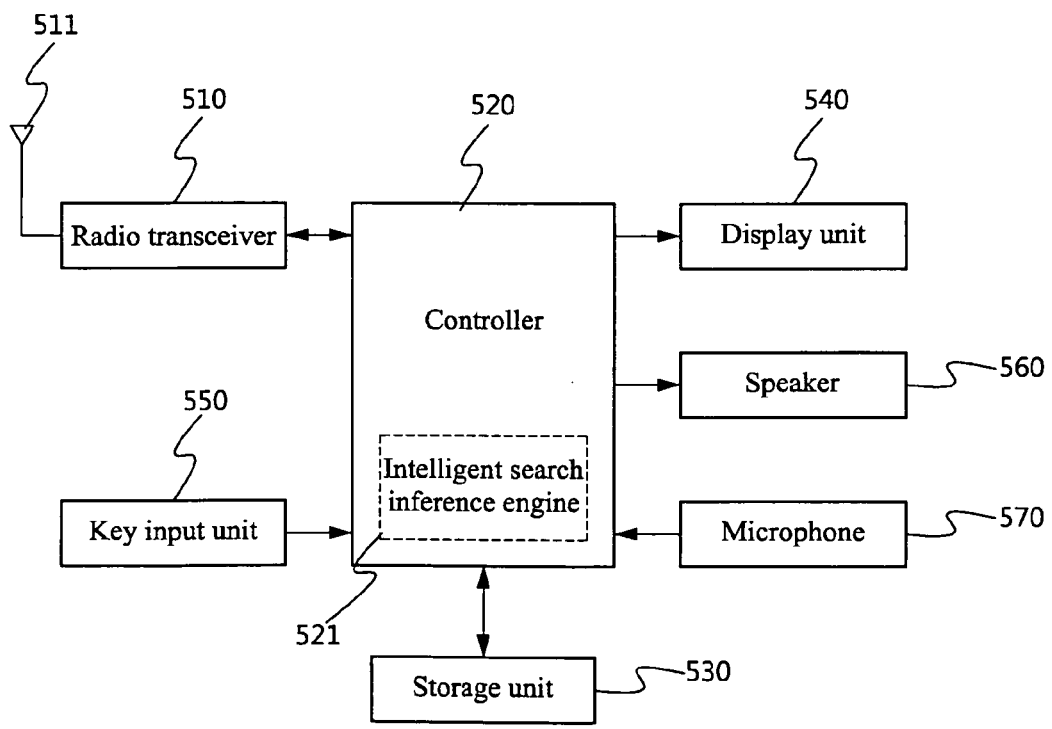
FIG. 7 is a block diagram illustrating a portable device having a phone-book search function according to an exemplary embodiment of the present invention.

FIG. 7 is a block diagram illustrating a portable device having a phone-book search function according to an exemplary embodiment of the present invention.

Referring to FIG. 7, the portable device according to an exemplary embodiment of the present invention includes a radio transceiver 510, a controller 520, a storage unit 530, a display unit 540, a key input unit 550, a speaker 560, and a microphone 570.

The radio transceiver 510 may include a duplexer, a high-frequency processor, and an intermediate frequency processor. The radio transceiver 510 receives a radio frequency (RF) signal induced by an antenna 511 via the duplexer, converts the received radio frequency signal into an intermediate frequency and then into a baseband signal, and provides the baseband signal to the controller 520. Also, the radio transceiver 510 converts a base band signal provided from the controller 520 into an intermediate frequency signal and then into a radio frequency signal, and provides the radio frequency signal to the antenna 511 via the duplexer.

Alternatively, the radio transceiver 510 may use a direct conversion system to directly demodulate a signal without frequency conversion for a received high frequency signal, instead of using a heterodyne receiving system to demodulate a base band signal with conversion from a high frequency signal into an intermediate frequency signal, as described above.

The controller 520 performs controlling and processing for unique functions and voice communication of the portable device. The controller 520 may include a baseband processor for processing the baseband signal provided from the radio transceiver 510. The controller 520 may also include a vocoder for digital processing of transmitted and received voice.

Upon receipt of an event for intelligent search of a phone book from the key input unit 550, the controller 520 searches for a user-selected item and associated items associated with the user-selected item on the database stored in the storage unit 430 according to a previous set priority, and displays both the user-selected item and the associated items associated with the user-selected item on the display unit 540. Here, the user-selected item and the associated items may be simultaneously displayed on the display unit 540.

The controller 520 may include an intelligent search inference engine 521 for the intelligent search of the phone book.

When the user selects a desired one of items of the phone book displayed on the display unit 540 using a predetermined method, the intelligent search inference engine 521 searches for information associated with information included in the user-selected item on the database according to a predetermined priority (i.e., the item information for searching the associated item associated with the user-selected item and a search priority of each of the item information for searching the associated item associated with the user-selected item), and displays the searched result on the display unit 540. After the searched result is displayed on the display unit 540 and the intelligent search for the phone book ends and when the intelligent search is activated again, the intelligent search inference engine 521 may display a previous display screen as an initial screen.

Here, the database may include detailed information included in the respective items of the phone book, call record, etc. The database may be updated as the user uses the portable device. Each item of the phone book may include at least one of a name, a phone number (e.g., portable phone, home and/or company) corresponding to the name, a facsimile number, an abbreviated number, a group name, an e-mail address, a birthday, a memorial day, a memo, a photograph, avatar, a receiving bell type, and a message ring type.

The intelligent search inference engine 521 may be implemented by a software program and may be executed by a processor included in the controller 520 (e.g., a baseband processor or an application processor).

The controller 520 displays, on the display unit 540, the user interface for setting the item information for the intelligent search of the phone book and a search priority of each of the item information, and stores a user-set content in the storage unit 530. Where the user does not separately set the item information for searching the associated item associated with the user-selected item and a search priority of each of the item information for searching the associated item associated with the user-selected item, the controller 520 performs the intelligent search based on a predetermined default value.

The storage unit 530 may be a non-volatile memory, such as a flash memory and an Electrically Erasable and Programmable Read Only Memory (EEPROM). The storage unit 530 stores a system program (e.g., an operating system) and/or any other application programs required for basic operation of the portable device.

For intelligent search of the phone book, the storage unit 530 stores information on associated items to be searched and a search priority of each information on associated items to be searched. The storage unit 530 also stores a separate database including the user-input phone book and the call record for the portable device.

For example, the display unit 540 may be a display device, such as a Liquid Crystal Display (LCD) and an Organic Light Emitting Diode (OLED). The display unit 540 displays a user interface, such as menus, an operation state, an application program execution screen, and the like of the portable device, based on an image signal provided from the controller 520.

In particular, the display unit 540 displays the user interface for intelligent search of the phone book and the search result from the intelligent search inference engine 521 under control of the controller 520.

The key input unit 550 includes a plurality of numerical and character keys, and function keys for special functions. When a key is operated by the user, the key input unit 550 provides a corresponding key input signal to the controller 520.

In particular, when an intelligent search key, an item move key or an item select key is operated by the user, the key input unit 550 provides a corresponding event signal to the controller 520.

The speaker 560 outputs the user's voice and a counterpart's voice upon a voice call. Upon the voice call, the microphone 570 receives the user's voice, converts the input voice to a corresponding electrical signal, and provides the electric signal to the controller 520.

While the portable device has been described as a mobile communication device, the method for searching a phone book according to example embodiments of the present invention may be also applied to various portable devices, such as a personal digital assistant (PDA), a portable multimedia player (PMP), and the like.

The method for searching a phone book according to example embodiments of the present invention may be also applied to various information processing devices having a phone-book search function, such as a personal computer (PC), a laptop computer, a phone-book search service server, and a home appliance, as well as the portable device.

As described above, according to the methods of searching a phone book, and the portable devices and the information processing apparatuses having a phone-book search function, when intelligent search of the phone book is activated, items associated with a user-selected item are searched on the database according to a predetermined priority, and the user-selected item and the associated items associated with the user-selected item are simultaneously displayed.

Thus, the information associated with user-selected information may be intelligently searched for, such that a search result optimized for a user may be displayed and unnecessary repetitive search may be reduced.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of searching a phone book in a portable device, the method comprising:
    selecting, by a key input unit included in a portable device, a desired item of a plurality of items included in a phone book list;
    searching, by a controller included in the portable device, for at least one item associated with the selected item in a database according to a priority;
    displaying, by a display unit, both the selected item and the searched associated at least one item; and
    processing an occurring event to update the database based on the occurring event:
    wherein the occurring event is at least one event of a voice communication event, an image communication event, a message transmission event and a message reception event that occurs after the selected desired item and the searched associated at least one item are simultaneously displayed, and
    the displaying both the selected item and the searched associated at least one item includes displaying the selected item at a first portion of a display area of the display unit and the searched associated at least one item around the selected item.

2. The method according to claim 1, wherein the desired item includes at least one of a name, a company name, a phone number, a facsimile number, an abbreviated number, a group name, an e-mail address, a birthday, a memorial day, a memo, a photograph, an avatar, a receiving bell, and a message ring.

3. The method according to claim 1, wherein the priority includes item information used to search for the at least one item associated with the selected item and search priority information for items associated with the same item information.

4. The method according to claim 1, wherein the displaying of both the selected item and the searched associated at least one item includes displaying, as representative information, at least one of a plurality of information included in each of the selected item and the searched associated at least one item.

5. The method according to claim 1, further comprising:
    selecting the selected item as another item after the selected item and the searched associated at least one item are simultaneously displayed; and,
    re-searching items associated with the selected another item.

6. An information processing apparatus having a phone-book search function, the apparatus comprising:
    a controller configured to control, and upon selection of a desired item of a plurality of items included in a phone book list, configured to search for at least one item associated with the selected item in a database according to a priority, and configured to display both the selected item and the searched associated at least one item;
    a storage unit configured to store the database; and
    a display unit configured to display a user interface under control of the controller,
    wherein the controller is configured to display the selected item at a first portion of a display area of the display unit and to display the searched associated at least one item around the selected item.

7. The apparatus according to claim 6, wherein the priority includes item information used to search for the at least one item associated with the selected item and search priority information for items associated with the same item information.

8. The apparatus according to claim 6, wherein the controller is configured to display, as representative information, at least one of a plurality of information included in each of the selected item and the searched associated at least one item.

9. A method of searching a phone book in an information processing apparatus, the method comprising:
    selecting, by a key input unit included in a portable device, a desired item of a plurality of items included in a phone book list;
    searching, by a controller included in the portable device, for at least one item associated with the selected item in a database according to a priority;
    displaying, by a display unit, both the selected item and the searched associated at least one item; and
    processing an occurring event to update the database based on the occurring event:

wherein the occurring event is at least one event of a voice communication event, an image communication event, a message transmission event and a message reception event that occurs after the selected item and the searched associated at least one item are simultaneously displayed, and the displaying both the selected item and the search associated at least one item includes displaying the selected item at a first portion of a display area of the display unit and the searched associated at least one item around the selected item.

10. The method according to claim 9, wherein the desired item includes at least one of a name, a company name, a phone number, a facsimile number, an abbreviated number, a group name, an e-mail address, a birthday, a memorial day, a memo, a photograph, an avatar, a receiving bell, and a message ring.

11. The method according to claim 9, wherein the priority includes item information used to search for the at least one item associated with the selected item and search priority information for items associated with the same item information.

12. The method according to claim 9, further comprising:
selecting the selected item as another item after the selected item and the searched associated at least one item are simultaneously displayed; and
re-searching items associated with the selected another item.

13. The method according to claim 1, further comprising:
selecting any item of the displayed search associated at least one item;
searching the database for at least one second item associated with the selected item of the displayed search associated at least one item; and
displaying, by the display unit, the selected item of the displayed search associated at least one item at the first portion of the display area and the at least one second search associated item around the selected item of the displayed search associated at least one item.

14. The apparatus according to claim 6, wherein the controller is configured to, upon selection of any item of the displayed search associated at least one item, search the database for at least one second item associated with the selected item of the displayed search associated at least one item, and to instruct the display unit to display the selected item of the displayed search associated at least one item at the first portion of the display area and to display the at least one second search associated item around the first portion of the display area.

15. The method according to claim 9, further comprising:
selecting any item of the displayed search associated at least one item;
searching the database for at least one second item associated with the selected item of the displayed search associated at least one item; and
displaying, by the display unit, the selected item of the displayed search associated at least one item at the first portion of the display area and the at least one second search associated item around the selected item of the displayed search associated at least one item.

16. The method according to claim 1, further comprising:
updating the database based on the occurring event,
wherein the processing an occurring event to update the database based on the occurring event includes processing the occurring event, by the controller, to update the database based on the occurring event.

17. The method of claim 1, wherein the selected item includes a plurality of related data items,
the searched associated at least one item includes at least one plurality of related data items,
the displaying of the selected item includes displaying at least two of the plurality of related data items included in the selected item, and
the displaying of the searched associated at least one item includes displaying at least two of the at least one plurality of related data items included in the searched associated at least one item.

18. The method of claim 17, wherein the searched associated at least one item is at least four items,
the at least one plurality of related data items included in the searched associated at least four items is at least four pluralities of related data items;
each of the searched associated at least four items includes one of the at least four pluralities of related data items,
the displaying both the selected item and the searched associated at least one item includes displaying at least two of the plurality of related data items included in each of the searched associated at least four items, and
the searched associated at least four items are displayed symmetrically around the selected item.

19. The method of claim 1, wherein the first portion of the display area of the display unit is a center portion of the display unit.

* * * * *